United States Patent [19]

Nomura et al.

[11] Patent Number: 4,839,591

[45] Date of Patent: Jun. 13, 1989

[54] MAGNETIC STROKE SENSOR FOR DETECTING THE STROKE OF A FLUID-POWER CYLINDER

[75] Inventors: Shinnya Nomura; Toshiro Toyoda, both of Kani; Kazuhisa Ikenoya, Hatano, all of Japan

[73] Assignee: Kayaba Kogyo Kabushiki-Kaisha, Tokyo, Japan

[21] Appl. No.: 130,821

[22] Filed: Dec. 9, 1987

[30] Foreign Application Priority Data

Dec. 16, 1986 [JP] Japan ............................ 61-193294[U]
Dec. 16, 1986 [JP] Japan ............................ 61-193295[U]
Dec. 16, 1986 [JP] Japan ............................ 61-193296[U]

[51] Int. Cl.$^4$ .................... G01B 7/14; F01B 25/26; F01B 31/12
[52] U.S. Cl. .................................... 324/208; 92/5 R
[58] Field of Search ............... 324/207, 208, 173, 174; 92/5 R

[56] References Cited

U.S. PATENT DOCUMENTS

| 3,716,121 | 2/1923 | Frigger | 324/174 |
| 4,161,120 | 7/1979 | Cloarce | 324/123 |
| 4,549,469 | 10/1985 | Plester et al. | 324/208 |

Primary Examiner—Reinhard J. Eisenzopf
Assistant Examiner—Walter E. Snow
Attorney, Agent, or Firm—Jordan and Hamburg

[57] ABSTRACT

A method for easy and accurate positioning of a magnetic sensor in a fluid-power cylinder facing a magnetic scale on the lateral surface of a piston rod, wherein the sensor is supported by a hole in the cylinder, a piece of friction-resistant, non-magnetic material attached to the sensor projects from its detection surface towards the piston rod, and the non-magnetic material is made to keep in touch with the lateral surface of the moving piston rod by a pressure-applying bias. The friction-resistant, non-magnetic material is either fitted to the magnetic detection surface, or is formed into a tubular shape and fitted to the outer circumference of the sensor.

11 Claims, 3 Drawing Sheets

MAGNETIC STROKE SENSOR FOR DETECTING THE STROKE OF A FLUID-POWER CYLINDER

BACKGROUND OF THE INVENTION

This invention concerns a magnetic stroke sensor installed in a fluid-power cylinder which detects the stroke position of the piston rod by reading a magnetic scale embodied in it.

Fluid-power cylinders already exist wherein a piston rod is driven back and forth by means of the pressure of a fluid supplied to the cylinder, and a stroke sensor is fitted in order to detect the position of displacement of the rod. This system may take the form of, for example, a magnetic sensor consisting of a magnetic resistance element in the cylinder which reads a moving magnetic scale embedded at a given pitch on the lateral surface of the rod.

The magnetic sensor is seated in a fixing hole in the cylinder wall, with the magnetic detection surface facing the magnetic scale at a very small distance away. When the piston rod moves with respect to the cylinder, the magnetic flux changes every time the magnetic element forming the scale passes in front of the sensor, and the sensor outputs an alternating waveform of which one cycle corresponds to one passage of the magnetic element. These wave cycles can then be converted to pulses by a comparator, of which the displacement of the piston rod can be found by counting.

If however the distance between the magnetic scale and magnetic detection surface of the sensor facing it changes, the amplitude of the sensor output or its median value will change. In order to obtain a stable output, therefore, it is necessary to control the gap between the sensor surface and the scale very accurately.

Normally, when the magnetic sensor is fitted to the cylinder, a fixing hole is formed in the cylinder wall by a drill or other tool, and the sensor is positioned by bringing a stepped area previously shaped on its rear end into contact with a stepped area formed inside the hole.

The distance between the sensor and the scale is then directly affected by the depth of the stepped area introduced by drilling. In comparison to controlling the cylinder wall thickness and the dimensions of the magnetic sensor, however, it is not so easy to control the depth of the stepped area accurately. This leads either to increased installation cost of the stroke sensor, or to a decrease in its precision of detection and reliability.

SUMMARY OF THE INVENTION

One objective of this invention is therefore to provide easy and reliable positioning of the magnetic sensor with respect to the magnetic scale.

Another objective of this invention is to ensure that the displacement of the sensor can follow the scale even when the piston rod is buckled due to load variations, and that its distance from the scale is always constant.

Yet another objective of the invention is to permit the sensor to be settled accurately and easily in its fixing hole even when the cylinder wall is very thick and the depth of the hole is much greater than its diameter.

In this invention, these effects are achieved by fixing a friction-resistant, non-magnetic piece of material to the magnetic sensor which projects from its detecting surface towards the piston rod, and by providing a pressure-applying means which enables the non-magnetic material to keep in touch with the lateral wall of the moving piston rod. As this piece of material fitted to the sensor is supported by the pressure-applying means and slides on the rod, the sensor is held at a fixed distance from the magnetic scale depending on the projecting dimensions of the non-magnetic material. It is thus not necessary to introduce a stepped area in order to position the sensor in its fixing hole, and even if the piston rod is buckled, the non-magnetic material continues to keep in touch with the moving rod due to the pressure-applying means and thereby maintains the distance between the sensor and the scale constant.

When the friction-resistant, non-magnetic material is fitted to the magnetic sensor, it can be either fitted to the magnetic surface, or formed into a tubular shape and fitted over the circumference of the sensor.

If a tubular piece is used, dimensional control is still easier if the rear edge of the tubular piece is brought into contact with a stepped area of large diameter formed on the rear end of the sensor.

If a holder supporting the sensor is arranged at the rear of the sensor in the fixing hole, the pressure-applying means then acts on the non-magnetic material via the holder, thereby permitting easy assembly and disassembly of the magnetic sensor even when the depth of the hole is greater than its diameter.

The objectives and advantages of the present invention will become further apparent from the attached drawings and the embodiments described below.

DETAILED DESCRIPTION OF THE PREFERRED EMBODIMENTS

Figure 1:
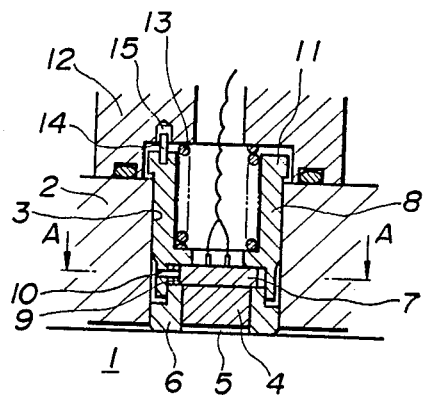
FIG. 1 is a vertical section through part of a fluid-power cylinder showing one preferable embodiment of this invention.
Figure 8:
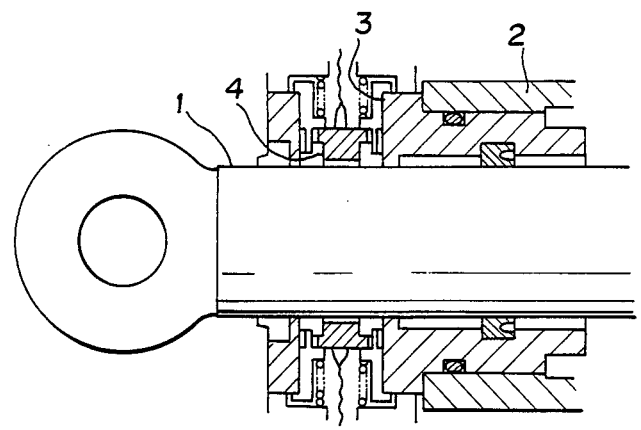
FIG. 8 is a vertical section through part of a fluid-power cylinder, showing location of the fixing hole.

In FIGS. 1 and 8, a magnetic sensor 4 is supported in sensor fixing hole 3 of cylinder 2 facing the magnetic scale formed on the lateral face of piston rod 1. Sensor fixing hole 3 is a throughhole of unique diameter formed in cylinder wall by means of drill cutting.

In order to maintain the specified distance between the magnetic detection surface 5 of the leading edge of sensor 4 and piston rod 1, a tubular piece 6 is inserted free to slide in fixing hole 3 such that it fits over the circumference of sensor 4. Piece 6 is constructed of a friction-resistant, non-magnetic material such as Teflon or brass, and its leading edge slides on piston rod 1.

Another part 7 of different and larger diameter is formed on the rear edge of sensor 4. The rear edge of tubular piece 6 is brought into contact with this part 7, and its length is such that its leading edge projects towards piston rod 1 by a specified distance from magnetic detection surface 5. When the leading edge of piece 6 is sliding on piston rod 1, therefore, the distance between magnetic detection surface 5 and the magnetic scale on piston rod 1 is maintained constant.

A tubular holder 8 is arranged at the rear of magnetic sensor 4. Holder 8 fits inside fixing hole 3 such that it is free to slide on its inner surface, and its leading edge is fixed by pressing over the circumference of the rear edge of tubular piece 6 so as to cover the outer surface of part 7 of sensor 4.

Figure 2:
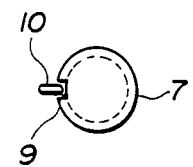
FIG. 2 is a horizontal section through the line A—A in FIG. 1.

In addition, as shown in FIG. 2, a pin 10 is inserted from the outer surface of holder 8 into a vertical groove 9 in part 7, thereby preventing the rotation of sensor 4 with respect to holder 8.

The upper edge of holder 8 projects toward the outer surface of cylinder 2, with a stepped area 11 of larger diameter than hole 3 on the projecting edge. This stepped area 11 prevents holder 8 from falling through the hole 3 together with sensor 4 and piece 6 when cylinder 2 is disassembled.

A cover 12 is fixed to the outer surface of cylinder 2 such that it encloses the upper edge of holder 8.

A spring 13 is inserted between holder 8 and cover 12 as a pressure-applying means which allows piece 6 to keep in touch with piston rod 1. By means of the recoil force of this spring, holder 8 presses piece 6 towards piston rod 1 via magnetic sensor 4.

Even if piston rod 1 should become buckled, therefore, the leading edge of piece 6 always keeps in touch with the rod 1, and the distance between magnetic detection surface 5 and the magnetic scale is maintained constant.

By making pin 14 which projects to the upper edge coincide with hole 15 in cover 12, holder 8 restricts rotation. When sensor 4 is assembled, it is fixed to holder 8 and inserted in fixing hole 3, the sensor being set accurately in the correct orientation by this pin 14 and by said pin 10 which is located between sensor 4 and holder 8.

Further, by fixing sensor 4 to the leading edge of holder 8, it can be settled easily and accurately in the specified position in fixing hole 3 even when the hole is deep and of small diameter.

Although the above are preferred embodiments of the invention, they are not exhaustive, and various other design modifications are possible within the scope of the claims.

Figure 3:
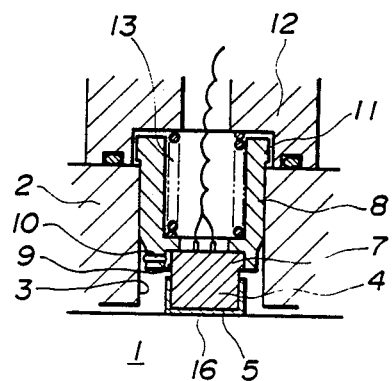
FIG. 3 is a vertical section through part of a fluid-power cylinder showing a different structure for the non-magnetic material.
Figure 4:
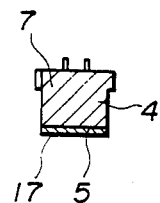
FIG. 4 is a perpendicular section through the magnetic sensor, showing another variation for the structure of the non-magnetic material.

For example in order to maintain a constant distance between the surface 5 and piston rod 1, instead of the tubular piece 6, a cap 16 of friction-resistant, non-magnetic material can be fitted to the leading edge of sensor 4 as shown in FIG. 3, or a plate 17 of similar material can be bonded to the detection surface 5 of sensor 4 as shown in FIG. 4.

Figure 5:
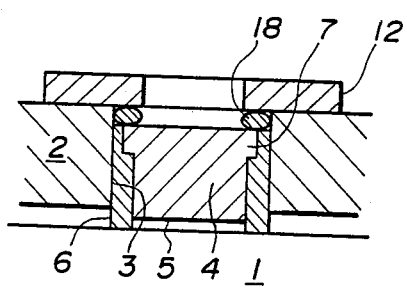
FIG. 5 is a vertical section through part of a fluid-power cylinder, showing a different embodiment of this invention.
Figure 6:
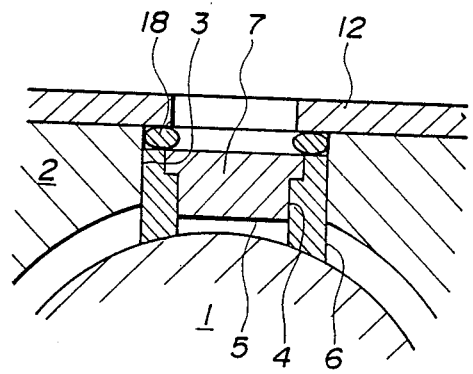
FIG. 6 is a horizontal section through part of a fluid-power cylinder, wherein a vertical section has been taken on a perpendicular line through FIG. 5.

Alternatively when the lateral wall of cylinder 2 is thin or the sensor hole 3 is shallow, instead of using holder 8, a ring of elastic material 18 can be inserted between sensor 4 and cover 12 to keep the leading edge of piece 6 in touch with the circumference of piston rod 1, as shown in FIG. 5 and FIG. 6. In this case, the leading edge of piece 6 is shaped to the circumference of piston rod 1 as shown in FIG. 6, and piece 6 is bonded to sensor 4 so as to position both and prevent rotation.

Figure 7:
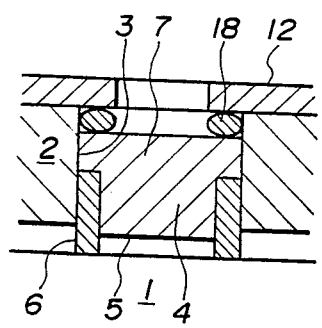
FIG. 7 is a vertical section through part of a fluid-power cylinder showing yet another embodiment of this invention.

Further instead of inserting a stepped area in piece 6, its upper edge can be brought into contact with the part 7 of different diameter in sensor 4 as shown in FIG. 7, part 7 being made to slide in fixing hole 3. In this way, the invention can be embodied in a simplified form.

What is claimed is:

1. A stroke sensor for a fluid power cylinder of the type having a piston rod having a magnetic scale and a cylinder means having a cover and a cylindrical wall disposed about said piston rod along with a passage opening up onto said cylindrical wall, the combination comprising a non-magnetic, friction-resistant means slidably mounted in said passage, a magnetic sensor means mounted on said non-magnetic, friction-resistant means, said non-magnetic, friction-resistant means having a front surface slidably engageable with said piston rod, said magnetic sensor means being spaced from said front surface, biasing means in said passage disposed between said cover and said non-magnetic, friction resistant means and biasing said non-magnetic, friction-resistant means toward said piston rod such that said front surface is in biasing and sliding contact with said piston rod, said biasing and sliding contact being maintained as said piston rod reciprocates in said cylindrical wall such that said magnetic sensor means is maintained at a constant spacing from said reciprocating piston rod as determined by said spacing between said front surface and said magnetic sensor means, and non-rotating means disposed between said non-magnetic, friction-resistant means and said cover to prevent said non-magnetic, friction-resistant means from rotating in said passage.

2. A stroke sensor according to claim 1, wherein said passage is a cylindrical passage, said non-magnetic, friction-resistant means having a cylindrical configuration, said cylindrical passage and said non-magnetic, friction-resistant means each having a cylindrical axis extending perpendicular to the longitudinal extent of said piston rod.

3. A stroke sensor according to claim 1, wherein said piston rod has a cylindrical cross-sectional configuration, said front surface having a partial cylindrical configuration conforming to the cylindrical cross-sectional configuration of said piston rod.

4. A stroke sensor according to claim 1, wherein said non-magnetic, friction resistant means comprises a tubular member disposed about said sensor means, 5. A stroke sensor according to claim 1, wherein said biasing means comprises a spring.

6. A stroke sensor according to claim 1, wherein said biasing means comprises an elastic material.

7. A stroke sensor according to claim 1, wherein said non-magnetic, friction-resistant means comprises a generally hollow cylindrical member, said biasing means comprising a spring disposed within said hollow cylindrical member.

8. A stroke sensor for a fluid power cylinder of the type having a piston rod having a magnetic scale and a cylinder means having a cylindrical wall disposed about said piston rod and a passage opening up onto said cylindrical wall, the combination comprising a holder means slidably mounted in said passage, a magnetic sensor means mounted on said holder means, said sensor means having a front surface facing said piston rod, a layer of non-magnetic, friction-resistant material disposed on said front surface, biasing means in said passage biasing said holder and said sensor means toward said piston such that said layer of non-magnetic, friction-resistant material is in biasing and sliding contact with said piston rod, said biasing contact being maintained as said piston rod reciprocates in said cylindrical wall such that said sensor means is maintained at a constant spacing from said piston rod as determined by the thickness of said layer of non-magnetic, friction-resistant material on said front passage, and non-rotating means extending between said holder means and said sensor means to prevent rotation between said holder means and said sensor means.

9. A stroke sensor according to claim 8, wherein said layer of non-magnetic, friction-resistant material has a generally U-shaped cross-sectional configuration.

10. A stroke sensor according to claim 8, wherein said cylindrical means comprises a cover, said holder means having a hollow cylindrical portion, said biasing means comprising a spring disposed in said hollow cylindrical portion and biased against said cover, said holder means having a second hollow cylindrical portion which partially receives said sensor means.

11. A stroke sensor for a fluid power cylinder of the type having a piston rod having a magnetic scale and a cylinder means having a cover and a cylindrical wall disposed about said piston rod along with a passage opening up onto said cylindrical wall, the combination comprising a holder slidably mounted in said passage means, a non-magnetic, friction-resistant means, said holder holding said non-magnetic, friction-resistant means, said holder and said non-magnetic, friction-resistant means being slidably mounted in said passage, a magnetic sensor means mounted on said non-magnetic friction-resistant means, said non-magnetic, friction-resistant means having a front surface slidably engageable with said piston rod, said magnetic sensor means being spaced from said front surface, biasing means in said passage disposed between said cover and said holder and biasing said non-magnetic, friction-resistant means toward said piston rod such that said front surface is in biasing and sliding contact with said piston rod, said biasing and sliding contact being maintained as said piston rod reciprocates in said cylindrical wall such that said magnetic sensor means is maintained at a constant spacing from said reciprocating piston rod as determined by said spacing between said front surface and said magnetic sensor means, said sensor means having an inner part opposite to said front surface, and a non-rotating means extending between said holder and said inner part to prevent rotation between said holder and said sensor means.

* * * * *